Nov. 19, 1940.   B. BOWSER   2,221,774
COLOR CHART
Filed Sept. 21, 1939   2 Sheets-Sheet 1

INVENTOR
BERNICE BOWSER
BY Sager & Malcolm
ATTORNEYS

Nov. 19, 1940.                    B. BOWSER                    2,221,774
                                 COLOR CHART
                         Filed Sept. 21, 1939        2 Sheets-Sheet 2
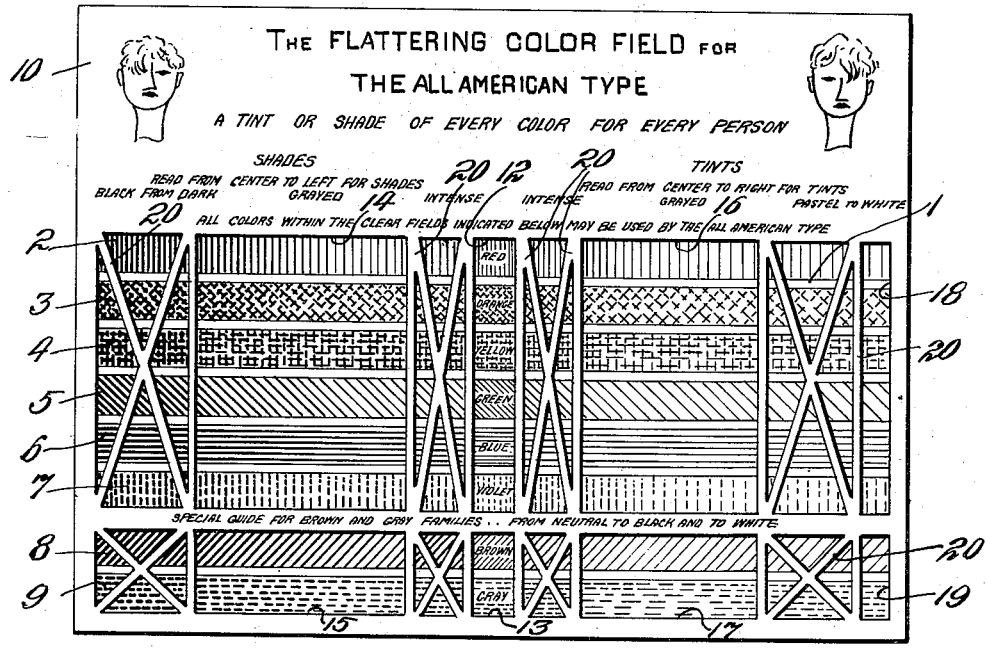
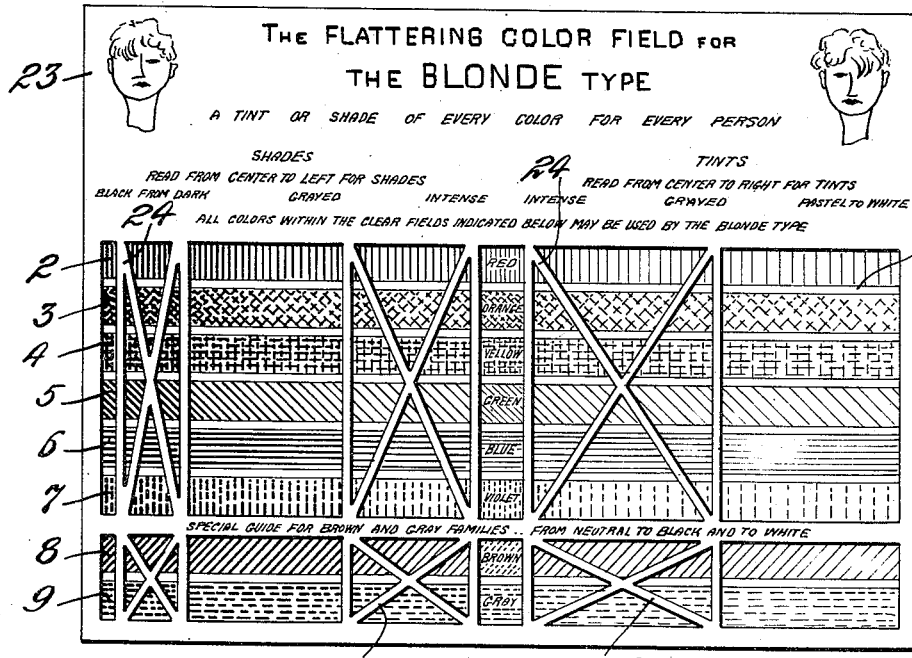
INVENTOR
BERNICE BOWSER
BY Sager & Malcolm
ATTORNEYS Patented Nov. 19, 1940

2,221,774

UNITED STATES PATENT OFFICE 2,221,774

COLOR CHART

Bernice Bowser, New York, N. Y.

Application September 21, 1939, Serial No. 295,886

10 Claims. (Cl. 35—59)

This invention relates to color charts for indicating harmonious color combinations and has for its object to provide a novel device of this type which is easy to understand and which will give an immediate visual indication of the various tints and shades of colors which may be worn or associated harmoniously with people or objects of different color types.

There are tints and shades of every conventional color in the spectrum which may be worn or associated harmoniously with every person according to his or her color type. Different types of men and women, such as blondes, brunettes, etc., have certain tints and shades of color which are particularly becoming to him or her, while other tints or shades of color may not be at all flattering. Women especially make an effort to wear clothes of tints and shades which are flattering to their particular color types, and there is also an increasing tendency for women to decorate their homes with furnishings, paints, wall papers, etc., of a coloring which blends harmoniously with their particular types of beauty.

Numerous attempts have been made to provide printed descriptions or "colorscopes" to indicate to people, particularly women, the colors which are best suited to their individual color types; but such printed descriptions are of almost no practical value because they are entirely too complicated to understand, and also because they do not give a visual representation of the tints and shades which they purport to describe, it being a well-known fact that different people will have entirely different ideas as to what constitutes such colors as "Aquamarine" or "Sunrise red," etc.

It has been established scientifically that the average human eye is capable of differentiating between more than 140,000 hues, but, because of the lack of any effective method or means for making color comparisons, a great many people live in a state of "mental color-blindness," which is an unawareness of the existence of color, or unawareness of the power of color to please or annoy, to flatter or destroy the beauty of an article, person or object. My invention overcomes this difficulty and provides, for the first time, a simple and effective chart which displays the conventional or primary colors of the spectrum and gives the layman an immediate visual indication of the various tints and shades of color which may be associated harmoniously with people or objects of different color types.

For purposes of illustration I shall describe my invention in its application to a particular device for indicating shades and tints of colors which I have found to harmonize with Caucasion people of various color types, although it will be understood that the invention is not limited to this particular use or to the specific embodiments hereinafter described. For the purpose of my invention it is desirable to classify people into a limited number of more or less arbitrary color groups; and I have found it convenient to divide white people into five easily recognized color types, the "Blonde" type, the "Brunette," the "Redhead," the "Silver gray," and what I call the "All American" type which is the person with brown hair ranging from that with glints of gold or red to the drab; to which may be added a sixth masculine type which I call the "Cosmopolitan" or bald man. For convenience this classification will be followed throughout the ensuing description.

In one form of the invention, which I will use for purposes of illustration, my color chart consists of two cards or plates; a base plate or surface containing the color gradations to be exhibited and a top plate or templet of cut-out or latticed construction which is superimposed upon the base plate and reveals the permissible shades and tints of colors as well as those which are excluded for a person of any given color type. In this embodiment of the invention the base plate preferably contains eight parallel rows or bands of colors arranged in any desired order and comprising the six conventional colors of the spectrum which are red, orange, yellow, green, blue and violet, and the two additional colors brown and gray which are not conventional or primary colors of the spectrum but are included because they are so commonly worn. Each of the colors on this base plate varies in intensity from left to right, the darker shades being represented for example to the left of the center line, and the tints varying in such case from the center toward the right of the base plate.

Individual cut-out plates or templets are provided for each color type of person, each such templet having openings calculated and arranged to overlie and expose all of the tints and shades of color which I have found to blend harmoniously with the color type represented by that particular templet. Each templet also contains latticed or X-shaped lines or bars which accurately overlie and partly mask the tints and shades of color which are excluded for that particular color type while at the same time permitting said excluded tints and shades of color to be viewed for purposes of comparison with the permissible tints and shades of color.

The two-piece color chart described above is particularly suitable for use in large sizes for platform demonstrations, window and counter displays, etc. For other purposes, especially for use as individual color buying guides, I prefer to print the entire chart on a single miniature card which may be carried in the pocket or purse where it will be available at all times for instantaneous reference by the user. In such case the rows of colors are preferably printed on the card in the manner described above, and the "latticed" portions are also printed directly on the card in the proper positions to indicate the permissible tints and shades of color as well as the tints and shades of color which are excluded for the individual color type which is represented thereby.

These and other features and advantages of the invention will be described in connection with the accompanying drawings, wherein:

Fig. 2 is a plan view showing one of the cut-out plates or templets adapted to be superimposed upon the color plate of Fig. 1, this particular templet representing the "All American" color type previously referred to;

Fig. 3 is a plan view showing the templet of Fig. 2 superimposed upon the color plate of Fig. 1, providing an immediate visual indication of the flattering color field for the "All American" color type; and Fig. 4 is a composite view similar to Fig. 3 but with a superimposed templet designed for the "Blonde" color type.

Figure 1:
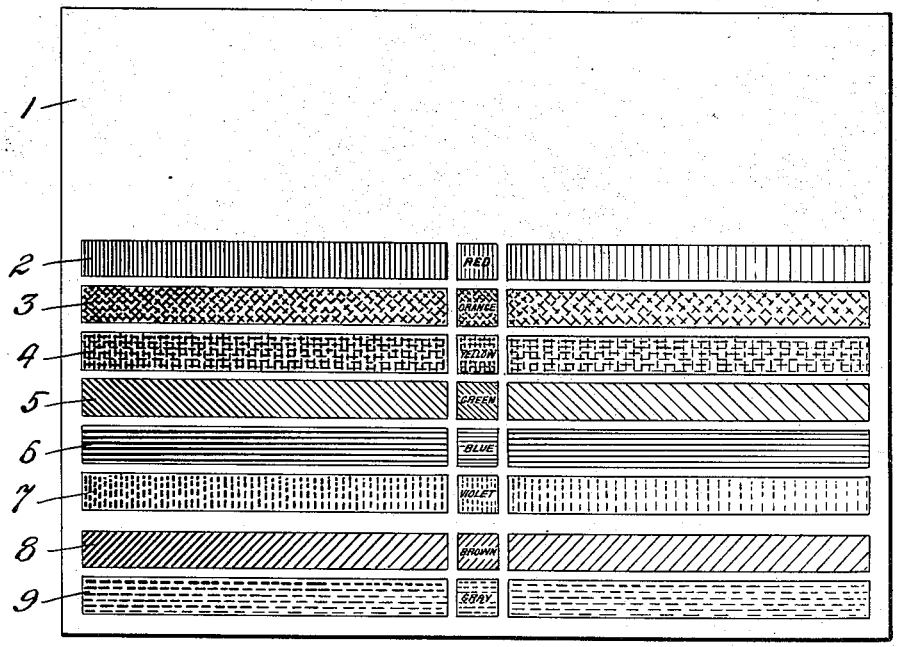
Fig. 1 is a plan view showing a preferred type of base plate or surface forming part of the two-piece color chart described above.

The base plate shown in Fig. 1 comprises a sheet 1 of cardboard or other suitable material containing eight elongated parallel rows or bands of color which are numbered from 2 to 9 and consist, in the order named, of the conventional colors of the spectrum, red, orange, yellow, green, blue and violet, and the additional colors brown and gray which are included because they are so commonly worn by men as well as women. Each of the colors on this chart varies gradually in intensity from left to right, the darker shades being represented to the left of the center of the card, and the tints varying from the center toward the right of the card. The small squares of color in the center of the card are the pure colors forming a column intermediate the shades and tints and are labelled "Red," "Orange," "Yellow," etc. for the convenience of the user. Of course the various colors need not be arranged on the surface of card 1 in the precise order or alignment disclosed, and the relative positions of the darker shades and the lighter tints may of course be reversed or otherwise altered, but I have found the arrangement of Fig. 1 to be a very convenient one.

Figure 2:
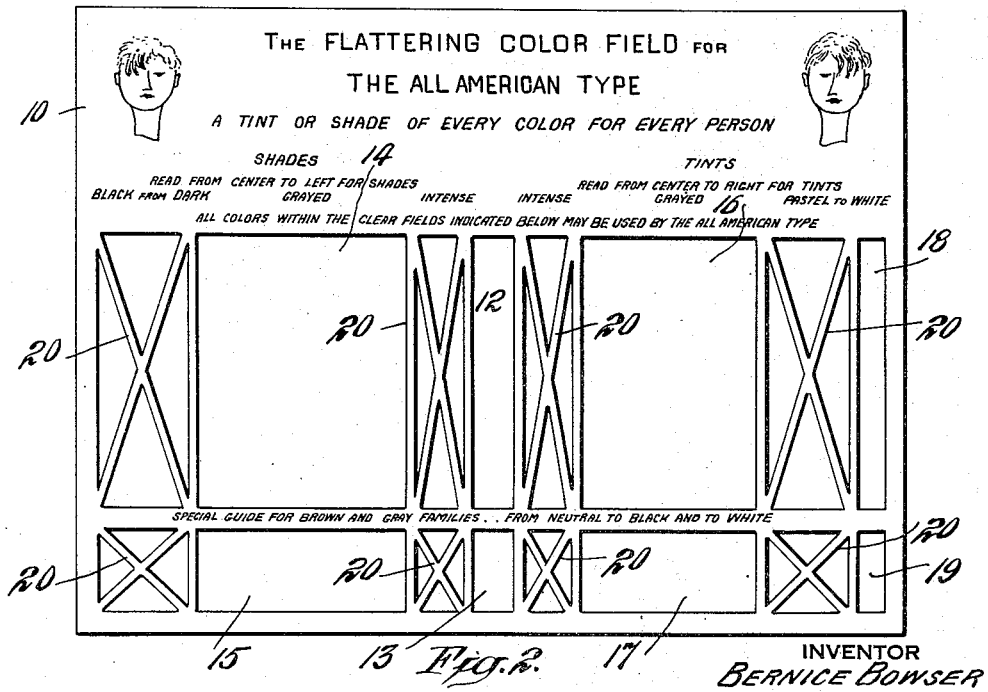

Fig. 2 shows a latticed templet 10 which is adapted to be superimposed upon the base plate of Fig. 1 for the purpose described above, this particular templet being designed for the "All American" color type, which, as previously stated, is the person with brown hair ranging from that with glints of gold or red to the drab. The templet 10 has central cut-out portions 12 and 13 which are adapted to overlie and expose the central column of primary colors "Red," "Orange," "Yellow," etc. on the base plate 1 when the templet is superimposed thereon. The templet 10 also has a plurality of openings or cut-out portions 14, 15, as well as 16, 17 and 18, 19, which are adapted to overlie and expose the "flattering color field," which includes the entire range of shades and tints which harmonize with the "All American" color type, when the templet 10 is superimposed upon the base plate 1; and the templet also contains a plurality of latticed or X-shaped sections 20 on both sides of the central openings 12, 13, which are adapted to overlie and partially but not completely mask the shades and tints of color on the base plate 1 which do not harmonize with the "All American" color type and are therefore excluded for this particular type of person or object. The arrangement of these openings 14, 15, etc., and the latticed portions 20 of the templet 10, is based upon exhaustive research although the invention is not limited thereto.

Fig. 3 shows the templet 10 of Fig. 2 superimposed upon the base plate or color card 1 of Fig. 1, and it will be understood that the templet may be permanently fastened to the base plate in this position if desired, although the primary purpose in making the base plate and templet in separate units is to enable a single base plate such as the base plate 1 to be used interchangeably with various different templets representing different color types for platform demonstrations, window and counter displays, etc. It will be observed that when the parts are assembled as shown in Fig. 3 the openings 14, 15 and 16, 17 and 18, 19 will completely expose the relatively wide ranges of shades and tints of all the color fields 2 to 9 inclusive which I have found to harmonize with the so-called "All American" color type, while the various latticed portions 20 of the templet 10 overlie and partly mask the shades and tints of colors which are unflattering to, and should therefore be avoided by, such "All American" color type. The reason why I prefer to provide the templet 10 with latticed or X-shaped sections which only partly mask the excluded shades and tints of color, instead of having these particular portions of the templet solid so as to completely hide these colors, is that I have found it much better to allow the excluded colors to show through the templet in order to give the user an opportunity to compare the undesirable tints and shades with the desirable or flattering tints and shades, which makes possible a much more accurate comparison and selection than would otherwise be possible.

Fig. 4 shows another composite color chart consisting of a base plate 1 which is identical with the base plate 1 of Figs. 1 to 3, and a templet 23 which is specially constructed for the "Blonde" color type and is therefore quite different from the templet 10 of the "All American" color type previously described. It will be observed that the latticed portions 24 of the templet 23, prescribing the shades and tints of color excluded to the "Blonde" type, occupy entirely different relative positions than the latticed portions 20 of the templet 10 for the "All American" type, and that the open or clear portions of the templet 23 representing the flattering color field for the "Blonde" person are appreciably smaller than the total flattering color field available to the "All American" type previously described. At the same time, it will be observed that there are many tints and shades of every one of the colors 2 to 9 inclusive available to the "Blonde" color type.

The invention claimed is:

1. A device for indicating colors which harmonize with people or objects of a given color type, comprising a chart containing a plurality of color gradations, means associated with said chart for indicating color gradations which harmonize with said given color type, and means associated therewith for partly masking color gradations which do not harmonize with said given color type while leaving same at least partly exposed for purposes of comparison with the said harmonious color gradations.

2. A device for indicating shades and tints of colors which harmonize with people or objects of a given color type, comprising a chart containing a plurality of different colors, some of which will harmonize with said given color type, each of said colors varying in intensity from the dark shades to the light tints of its particular color, and means for simultaneously indicating the shades and tints of said colors which harmonize with said given color type.

3. A device for indicating shades and tints of color which harmonize with people or objects of a given color type, comprising a surface containing a plurality of different colors each varying in intensity from the dark shades to the light tints of its particular color, and a templet adapted to be superimposed upon said surface and having openings positioned to expose shades and tints of said colors which harmonize with said given color type and means for partly masking non-harmonious shades and tints of said colors while leaving same partly exposed for purposes of comparison with the harmonious shades and tints of said colors.

4. A device for indicating shades and tints of colors which harmonize with people or objects of a given color type, comprising a surface containing a plurality of bands of different colors each varying in intensity from the dark shades to the light tints of its particular color, and a templet adapted to be superimposed upon said surface and having openings positioned to expose portions of said bands which harmonize with said given color type and latticed portions adapted to overlie and partly mask non-harmonious portions of said bands while leaving same partly exposed for purposes of comparison with said harmonious portions of said bands.

5. A device for indicating shades and tints of colors which harmonize with people or objects of a given color type, comprising a chart containing a plurality of parallel bands of different colors each varying in intensity from dark shades to light tints of its particular color, and means for partly masking non-harmonious shades and tints of colors on said chart while leaving same partly exposed for comparison with the harmonious portions of said bands.

6. A device for indicating shades and tints of colors which harmonize with people or objects of various color types, comprising a surface containing a plurality of elongated parallel bands of different colors consisting respectively of the conventional colors of the spectrum and the additional colors brown and gray, each of said bands varying gradually in intensity from the dark shades to the light tints of its particular color, and a plurality of templets representing different color types adapted to be superimposed upon said surface and each having openings arranged to expose portions of said color bands which harmonize with a given color type and latticed portions adapted to partly mask non-harmonious shades and tints of colors on said surface while leaving same partly exposed for purposes of comparison with the harmonious portions of said bands.

7. A device for indicating shades and tints of colors which harmonize with people or objects of a given color type, comprising a chart containing a plurality of bands of different colors each varying in intensity from the dark shades to the light tints of its particular color, at least some of the shades and tints of said colors harmonizing with said given color type, and indicia on said chart masking portions of said color bands which do not harmonize with said given color type while leaving same at least partly exposed for purposes of comparison with the harmonious portions of said bands.

8. A device for indicating shades and tints of colors which harmonize with people or objects of a given color type, comprising a chart containing a plurality of parallel bands of different colors consisting respectively of the conventional colors of the spectrum and the additional colors brown and gray, each of said bands varying gradually in intensity from the dark shades to the light tints of its particular color, and latticed lines on said chart partly masking portions of said bands which do not harmonize with said given color type while leaving same partly exposed for purposes of comparison with other portions of said bands.

9. A device for indicating shades and tints of colors which harmonize with people or objects of a given color type, comprising a surface containing a plurality of elongated parallel bands of different colors consisting respectively of the conventional colors of the spectrum and the additional colors brown and gray, each of said bands varying gradually in intensity from the dark shades at one end of said surface to the light tints at the other end of said surface and having the pure colors forming a column in the center of said surface intermediate said dark shades and said light tints, and means on said surface exposing said central column of colors and portions of said bands which harmonize with said given color type and for partly masking non-harmonious portions of said bands while leaving same partly exposed for purposes of comparison with the harmonious portions of said bands.

10. A device for indicating shades and tints of colors which harmonize with people or objects of various color types, comprising a surface containing a plurality of elongated parallel bands of different colors consisting respectively of the conventional colors of the spectrum and the additional colors brown and gray, each of said bands varying gradually in intensity from the dark shades at one end of said surface to the light tints at the other end of said surface and having the pure colors forming a column in the center of said surface intermediate said dark shades and said light tints, and a plurality of templets representing different color types adapted to be superimposed upon said surface and each having openings arranged to expose the central column of colors and portions of said color bands which harmonize with a given color type and having latticed portions adapted to partly mask non-harmonious portions of said bands while leaving same partly exposed for purposes of comparison with the harmonious portions of said bands.

BERNICE BOWSER.